United States Patent
Yang

(10) Patent No.: US 12,237,706 B2
(45) Date of Patent: Feb. 25, 2025

(54) ELECTRONIC DEVICE AND CHARGING METHOD THEREOF

(71) Applicant: ASUSTeK COMPUTER INC., Taipei (TW)

(72) Inventor: Chih-Hsien Yang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 716 days.

(21) Appl. No.: 17/381,644

(22) Filed: Jul. 21, 2021

(65) Prior Publication Data

US 2022/0037909 A1 Feb. 3, 2022

(30) Foreign Application Priority Data

Jul. 29, 2020 (TW) ................................ 109125680

(51) Int. Cl.
*H02J 7/00* (2006.01)

(52) U.S. Cl.
CPC ........ *H02J 7/00712* (2020.01); *H02J 7/0048* (2020.01); *H02J 7/0071* (2020.01); *H02J 7/00714* (2020.01)

(58) Field of Classification Search
CPC .. H02J 7/007182; H02J 7/0048; H02J 7/0071; H02J 7/00712

(Continued)

(56) References Cited

U.S. PATENT DOCUMENTS 8,421,414 B2 * 4/2013 Lee .......................... G06F 1/263
320/132
8,674,662 B2 * 3/2014 Chueh ................... H02J 7/0071
320/152

(Continued)

FOREIGN PATENT DOCUMENTS

CN 106787034 A 5/2017
CN 107681713 A 2/2018
(Continued)

OTHER PUBLICATIONS

Ricky Luo, What is a Battery Cell, Battery Module, and Battery Pack. (Year: 2023).*
Advantages and Disadvantages of Linear Regression in Machine Learning, Naresh Kumar (Year: 2019).*
CN111463856A_Description_Translation (Year: 2020).*

* cited by examiner

*Primary Examiner* — John T Trischler
(74) *Attorney, Agent, or Firm* — McClure, Qualey & Rodack, LLP

(57) ABSTRACT

An electronic device includes a battery module, a power supply, a power controller, and a processor. The power controller obtains an initial battery capacity of the battery module and a current time when the power supply is connected to an external power supply. The processor sets a preset target battery capacity and a charging completion time, obtains a charging battery capacity according to the preset target battery capacity, the initial battery capacity and a charging time interval, calculates a calculated battery capacity-time-ratio according to the charging battery capacity and the charging time interval, converts the calculated battery capacity-time-ratio into a charging battery capacity, and transmits it to the power controller. The power controller converts the supplied power to a charging voltage or a charging current correspondingly according to the charging battery capacity, to charge the battery module to the preset target battery capacity by a charging end time.

14 Claims, 8 Drawing Sheets

(58) Field of Classification Search
USPC .......................................... 320/108, 109, 155
See application file for complete search history.

(56) References Cited

U.S. PATENT DOCUMENTS

| | | | | |
|---|---|---|---|---|
| 9,843,207 B2* | 12/2017 | Lin | .......................... | H02J 7/007 |
| 10,110,040 B2* | 10/2018 | Onat | ...................... | H04R 25/30 |
| 10,411,491 B2* | 9/2019 | Liang | .................... | H02J 7/0071 |
| 10,547,180 B2* | 1/2020 | Crawford | .............. | G05B 19/05 |
| 10,574,073 B2* | 2/2020 | Han | .......................... | H02J 1/10 |
| 11,165,269 B2* | 11/2021 | Yin | ..................... | H02J 7/00712 |
| 11,169,214 B2* | 11/2021 | Crawford | ............. | G01R 31/367 |
| 11,381,100 B2* | 7/2022 | Yu | ........................ | H02J 7/0068 |
| 11,658,503 B2* | 5/2023 | Arizono | ............ | H02J 7/007182 |
| | | | | 320/137 |
| 12,093,111 B2* | 9/2024 | Cheng | .................... | G06F 1/263 |
| 2009/0206797 A1* | 8/2009 | Chueh | ................... | H02J 7/0071 |
| | | | | 320/150 |
| 2009/0243549 A1* | 10/2009 | Matsumura | ......... | H01M 10/441 |
| | | | | 320/155 |
| 2010/0207772 A1* | 8/2010 | Yamamoto | .............. | B60L 53/14 |
| | | | | 340/636.2 |
| 2011/0109272 A1* | 5/2011 | Lee | ......................... | G06F 1/263 |
| | | | | 320/132 |
| 2012/0239340 A1* | 9/2012 | Chen | .................... | G01R 31/385 |
| | | | | 702/123 |
| 2016/0172887 A1* | 6/2016 | Lin | ......................... | H02J 7/007 |
| | | | | 320/164 |
| 2016/0190847 A1* | 6/2016 | Han | ......................... | H02J 1/10 |
| | | | | 320/134 |
| 2017/0077719 A1* | 3/2017 | Onat | ................... | H02J 7/00712 |
| 2018/0131200 A1* | 5/2018 | Crawford | ............ | H02J 7/00036 |
| 2019/0020201 A1* | 1/2019 | Liang | .................... | H02J 7/0071 |
| 2019/0267814 A1* | 8/2019 | Yin | .................... | H02J 7/007182 |
| 2020/0127474 A1* | 4/2020 | Crawford | ............ | G05B 23/0294 |
| 2020/0212701 A1* | 7/2020 | Yu | ......................... | H01M 10/44 |
| 2020/0373779 A1* | 11/2020 | Arizono | ............. | H01R 10/486 |
| 2023/0266813 A1* | 8/2023 | Cheng | ................... | G06F 1/3243 |
| 2023/0378550 A1* | 11/2023 | Hung | .................. | H01M 10/482 |
| 2024/0113345 A1* | 4/2024 | Lai | ...................... | H01M 10/425 |

FOREIGN PATENT DOCUMENTS

| | | |
|---|---|---|
| CN | 106299516 B | 12/2019 |
| CN | 110676905 A | 1/2020 |
| CN | 111463856 A * | 7/2020 |

ELECTRONIC DEVICE AND CHARGING METHOD THEREOF

CROSS-REFERENCE TO RELATED APPLICATION

This application claims the priority benefit of Taiwan applications serial No. 109125680, filed on Jul. 29, 2020. The entirety of the above-mentioned patent application is hereby incorporated by reference herein and made a part of specification.

BACKGROUND OF THE INVENTION

Field of the Invention

The invention relates to an electronic device using a dynamic charging power and a charging method.

Description of the Related Art

Generally, a portable electronic device has a built-in rechargeable battery to provide power. Sometimes when the battery in the electronic device is in a charging process and maintains connection to a power supply for a long time, the service life of the battery is affected while the battery is maintained at a high battery capacity state or a full battery capacity state, such as 80% to 100%. Moreover, it results in a loss of battery life, even causes damage to the battery.

BRIEF SUMMARY OF THE INVENTION

According to the first aspect, an electronic device is provided. The electronic device includes a battery module, a power supply, a power controller and a processor. The power supply is used to provide a supplied power. The power controller is electrically connected between the battery module and the power supply to obtain an initial battery capacity of the battery module and a current time when the power supply is connected to an external power supply and controls the power supply to charge the battery module. The processor is electrically connected to the power controller and used to set a preset target battery capacity and a charging completion time. The processor obtains a charging battery capacity according to the preset target battery capacity and the initial battery capacity and a charging time interval according to the charging completion time and the current time, and calculates a calculated battery capacity-time-ratio according to the charging battery capacity and the charging time interval. The processor converts the calculated battery capacity-time-ratio into a charging power according to a power conversion equation, and transmits the charging power to the power controller. The power controller converts the supplied power provided by the power supply into a charging voltage or a charging current correspondingly according to the charging power to charge the battery module to the preset target battery capacity at a charging end time of the charging time interval.

According to the first aspect, a charging method applied to an electronic device with a battery module is provided. The charging method including: setting a preset target battery capacity and a charging completion time; obtaining an initial battery capacity of the battery module and a current time when the electronic device is connected to an external power supply; obtaining a charging battery capacity according to the preset target battery capacity and the initial battery capacity, obtaining a charging time interval according to the charging completion time and the current time; calculating a calculated battery capacity-time-ratio according to the charging battery capacity and the charging time interval; converting the calculated battery capacity-time-ratio into a charging power according to a power conversion equation; and charging the battery module to the preset target battery capacity at a charging end time of the charging time interval according to the charging power.

In summary, the charging power is dynamically adjusted during a charging time interval in the embodiments, so that the battery is charged to a fully battery capacity state at the charging end time of the charging time interval, and the problem that the battery life is reduced when the battery is in a fully battery capacity state or a high battery capacity state for a long time is avoided. Therefore, the dynamic charging power method disclosed herein optimizes the battery life and effectively extends the battery life, thus provides users with better charging options.

DETAILED DESCRIPTION OF THE EMBODIMENTS

Figure 1:
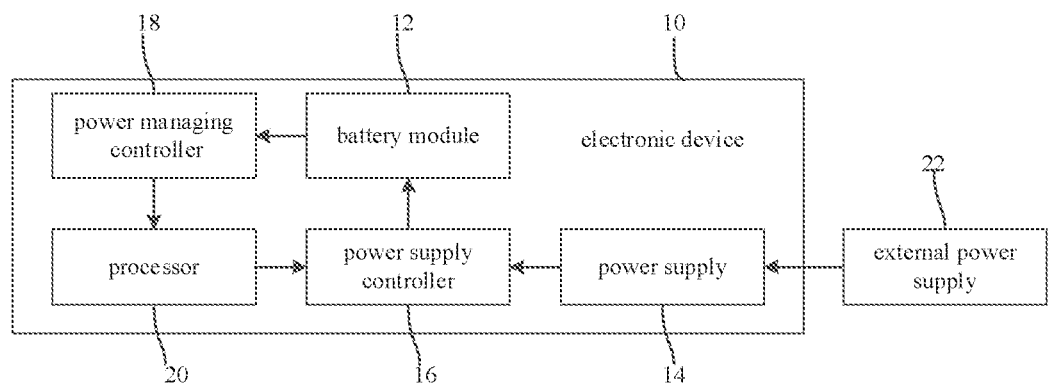
FIG. 1 is a block schematic diagram showing an electronic device according to an embodiment.

FIG. 1 is a block schematic diagram showing an electronic device according to an embodiment. Please refer to FIG. 1. An electronic device 10 includes a battery module 12, a power supply 14, a power supply controller 16, a power managing controller 18 and a processor 20. In an embodiment, the electronic device 10 is a notebook, a mobile phone, a personal digital assistant (PDA), a tablet, a navigation device, or any other portable electronic devices, which is not limited herein. In an embodiment, the processor 20 is a central processing unit (CPU) or a microprocessor.

As shown in FIG. 1, the power supply 14 is electrically connected to an external power supply 22 to provide a supplied power. In an embodiment, the external power supply 22 is commercial power or the power provided by a mobile power or other computer device, which is not limited. The power supply controller 16 is electrically connected to the battery module 12 and the power supply 14 to control the power supply 14 to charge the battery module 12 with the supplied power. The power managing controller 18 is electrically connected battery module 12 to obtain battery information of the battery module 12. The battery information includes an initial battery capacity of the battery module 12 and a current time when the power supply 14 is connected to the external power supply 22. The processor 20 is electrically connected the power supply controller 16 and the power managing controller 18. The processor 20 has a built-in charging optimization engine to control the entire charging process and to estimate the charging power by considering the state of the battery module 12 and the electronic device 10. In other words, the processor 20 sets a preset target battery capacity and a charging completion time, receives the initial battery capacity and the current time from the power managing controller 18, and obtains a minimum charge power required for the charging process by calculating the information.

Figure 2:
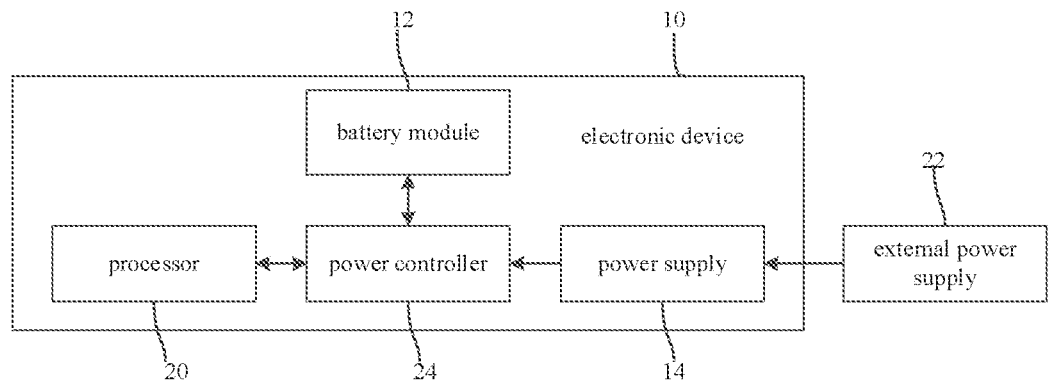
FIG. 2 is a block schematic diagram showing an electronic device according to another embodiment.

As shown in FIG. 2, in an embodiment, an electronic device 10 includes a battery module 12, a power supply 14, a power controller 24 and a processor 20. The power controller 24 includes the functions of the power supply controller 16 and the power managing controller 18. The power controller 24 is electrically connected to the battery module 12, the power supply 14 and the processor 20, to obtain an initial battery capacity of the battery module 12 and a current time when the power supply 14 is connected to an external power supply 22, and control the power supply 14 to charge to the battery module 12.

Figure 3:
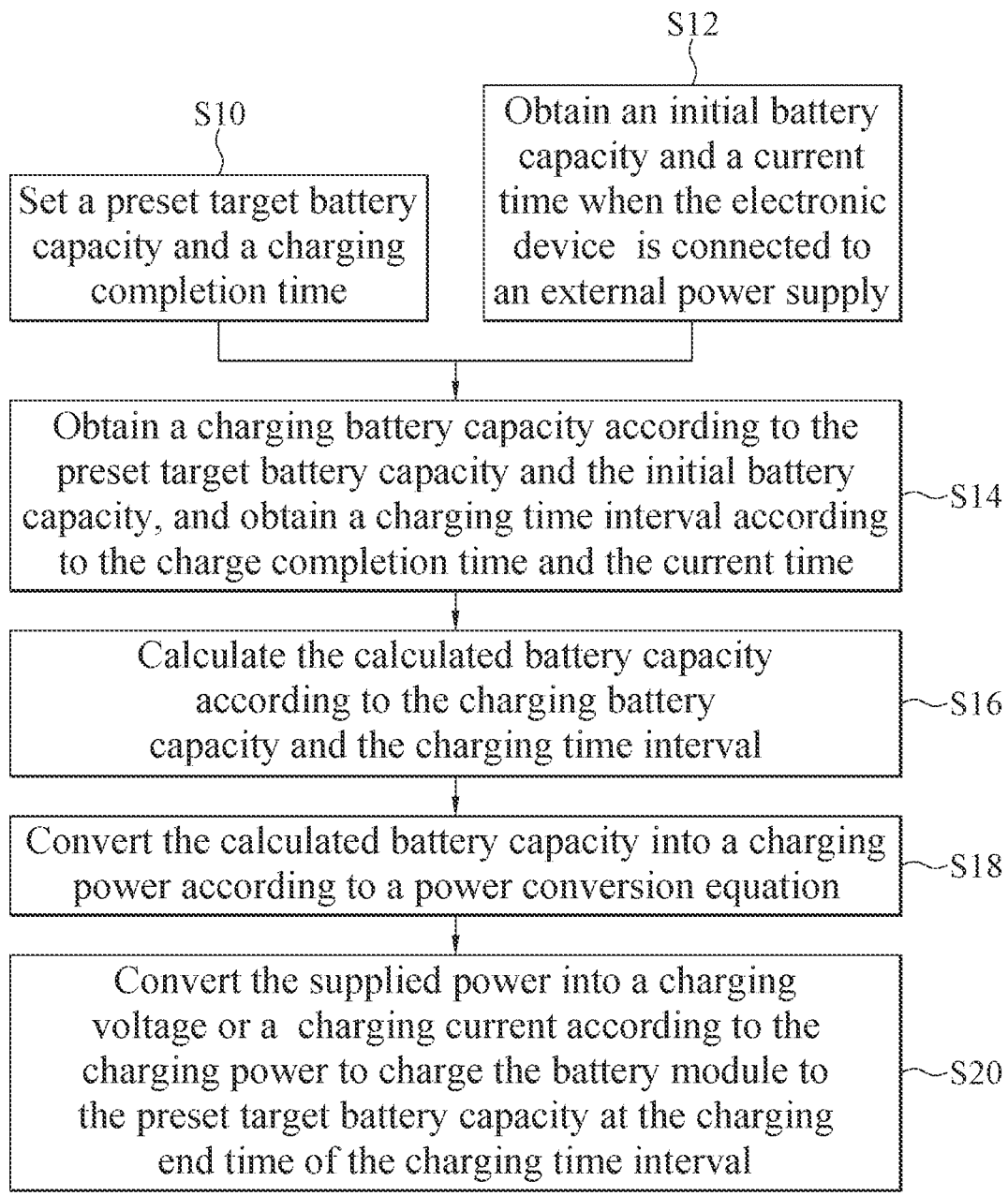
FIG. 3 is a flow schematic diagram showing a charging method according to an embodiment.

FIG. 3 is a flow schematic diagram showing a charging method according to an embodiment. Please refer to FIG. 1 and FIG. 3 at the same time. In an embodiment, the electronic device 10 performs a charging method included in step S10 to step S20. First, in step S10, set a preset target battery capacity and a charging completion time by the processor 20. In step S12, when the electronic device 10 being electrically connected to the external power supply via the power supply 14, the power managing controller 18 obtains an initial battery capacity (that is, the remaining battery capacity of the battery module 12 of the electronic device 10) and a current time when the electronic device 10 is connected to the external power supply 22, and transmits the initial battery capacity and the current time to the processor 20. Please refer to FIG. 1, FIG. 3, and FIG. 4 at the same time. When the processor 20 receives the initial battery capacity X and the current time $T_p$, as shown in step S14, the processor 20 calculates the difference value between the preset target battery capacity Y and the initial battery capacity X according to the preset target battery capacity Y and the initial battery capacity X to obtain a charging battery capacity (Y-X). And the processor 20 calculates the difference value between the charging completion time $T_c$ and the current time $T_p$ according to the charging completion time $T_c$ and the current time $T_p$, to obtain an actual charging time interval ($T_c$-$T_p$). Then, perform step S16. The processor 20 calculates a calculated battery capacity-time-ratio according to the charging battery capacity (Y-X) and the charging time interval ($T_c$-$T_p$). Since the preset target battery capacity Y, the initial battery capacity X, the charging completion time $T_c$ and current time $T_p$ are known, the power need to be charged to the battery module 12 within a defined time length (charging time interval) is estimated. That is, a calculated battery capacity-time-ratio is obtained by dividing the charging battery capacity (Y-X) by the charging time interval ($T_c$-$T_p$) by the processor 20. As shown in step S18, since a power conversion equation is the equation of the calculated battery capacity-time-ratio and the output charging power, the calculated battery capacity-time-ratio is converted into a charging power accordingly. The charging power is transmitted to the power supply controller 16 or the power controller 24 as the basis for the power supply controller 16 or the power controller 24 to convert the supplied power. Finally, as shown in step S20, based on the circuit characteristics of the battery module 12, the power supply controller 16 or the power controller 24 converts the supplied power provided by the power supply 14 into a charging voltage or a charging current according to the charging power, so as to charge the battery module 12 to the preset target battery capacity Y at the charging end time of the charging time interval.

Figure 4:
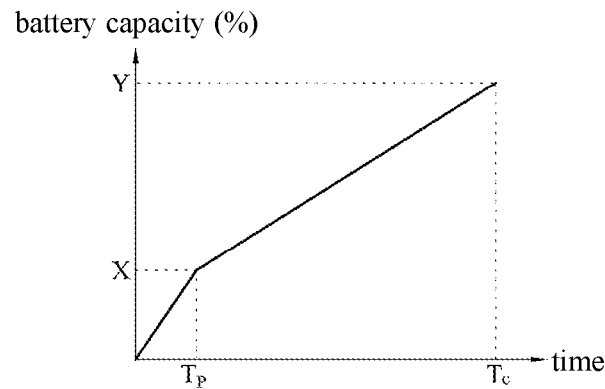
FIG. 4 is a schematic diagram showing a charging curve of battery capacity and time according to an embodiment.
Figure 5:
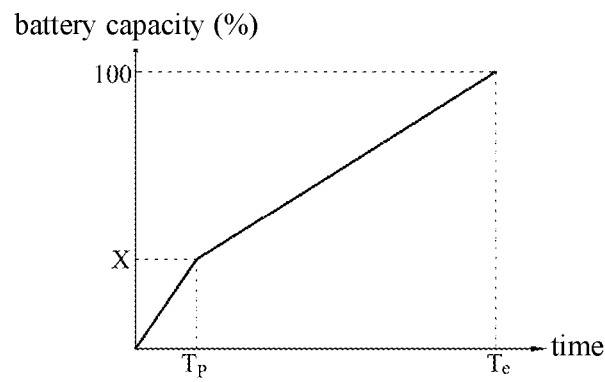
FIG. 5 is a schematic diagram showing a charging curve of battery capacity and time when a preset target battery capacity is the full battery capacity according to an embodiment.

In an embodiment, please refer to FIG. 1, FIG. 4 and FIG. 5 at the same time. The preset target battery capacity Y of the battery module 12 is full, and the charging completion time $T_c$ defines here is a charging end time $T_c$, such as an end time set by users or a customary end time obtained by the processor 20 according to a usage state history. Therefore, the charging battery capacity obtained by the processor 20 is 100-X and the charging time interval obtained by the processor 20 is $T_c$-$T_p$, and the processor 20 calculates the calculated battery capacity-time-ratio according to the charging battery capacity 100-X and the charging time interval $T_c$-$T_p$. After the processor 20 converts the calculated battery capacity-time-ratio into the charging power, the power supply controller 16 converts the supplied power into a charging voltage or a charging current according to the charge power, to charge the battery module 12 to the full battery capacity (the preset target battery capacity) at the charging end time of the charging time interval $T_c$-$T_p$.

In another embodiment, the preset target battery capacity Y is a preset high battery capacity (80%). Please refer to FIG. 1, FIG. 4 and FIG. 6. The preset target battery capacity Y is 80% of the battery capacity, the charging completion time $T_c$ is a user preset completion time or a customary completion time obtained by the processor 20 according to a usage state history, for example, n hours before the charging end time $T_c$ when the battery module reaches 80% of the battery capacity. Therefore, the charging completion time $T_c$ defines here is $T_c$-n, the charging battery capacity obtained by the processor 20 is 80-X and the charging time interval obtained by the processor 20 is $T_c$-n-$T_p$. The processor 20 calculates the calculated battery capacity-time-ratio according to the charging battery capacity 80-X and the charging time interval $T_c$-n-$T_p$. After the processor 20 converts the calculated battery capacity-time-ratio into the charging power, the power supply controller 16 converts the supplied power to a charging voltage or a charging current according to the charge power, to charge the battery module 12 to 80% of the battery capacity (the preset target battery capacity) during the charging time interval $T_c$-n-$T_p$. After that, the electronic device 10 keeps charging the battery module 12 to 100% of the battery capacity (the full battery capacity) at the charging end time $T_c$ through a slow charging speed in some embodiments. Therefore, a two-stage charging scheme is also applicable in the embodiments.

Figure 7:
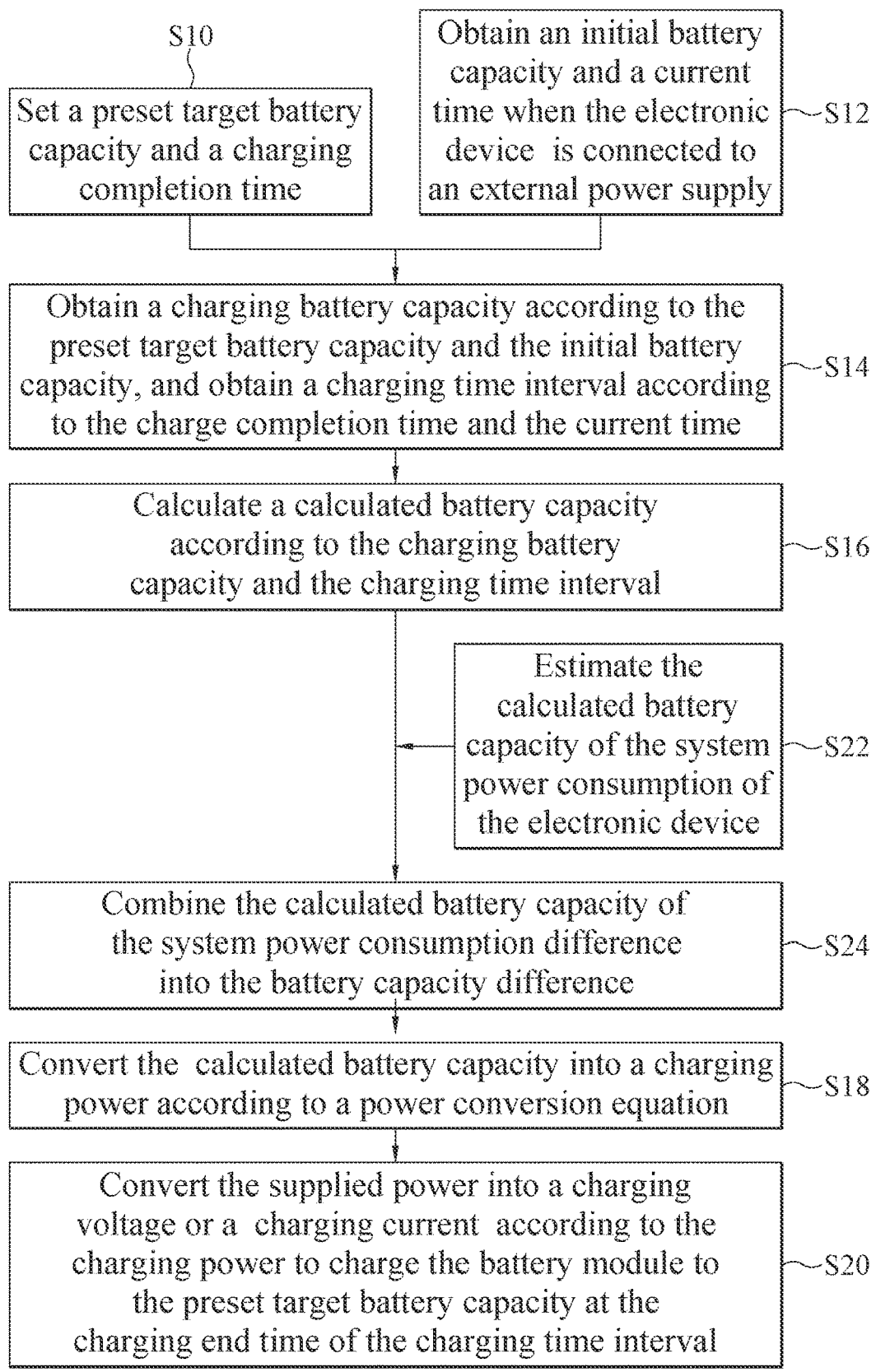
FIG. 7 is a schematic flowchart showing a charging method according to another embodiment.

The charging method of the embodiment as shown in FIG. 3 is to charge the battery module 12 under the condition that the internal power consumption of the system is small and ignorable. However, if the internal power consumption increases, the internal power consumption is considered, and the calculated battery capacity-time-ratio includes a battery capacity difference of a system power consumption. Please refer to FIG. 1 and FIG. 7. The charging method further includes step S22 and step S24, which are performed before the step S18. In step S22, the processor 20 estimates the calculated battery capacity-time-ratio when the system operation of the electronic device 10 is dropping in the past according to the history record of the system power consumption, and then estimates a system power consumption battery capacity difference of the electronic device. As shown in step S24, the processor 20 combines the system power consumption battery capacity difference into the calculated battery capacity-time-ratio calculated in step S16 to obtain a combined calculated battery capacity-time-ratio, and then, performs converting and charging as shown in steps S18 to S20. The content of this part is the same as that of the embodiment in FIG. 3, so please refer to the aforementioned description, which will not be repeated herein.

Figure 8:
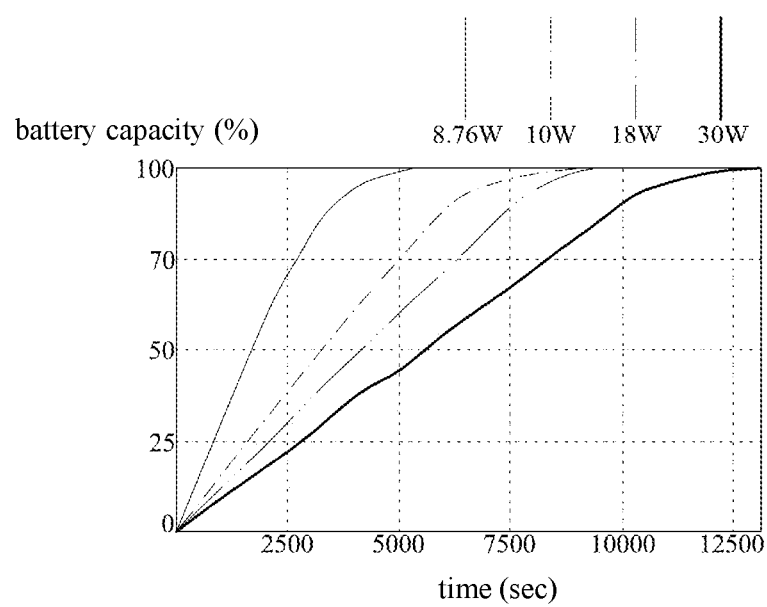
FIG. 8 is a schematic diagram showing the charging curves under different charging powers according to an embodiment.
Figure 9A:
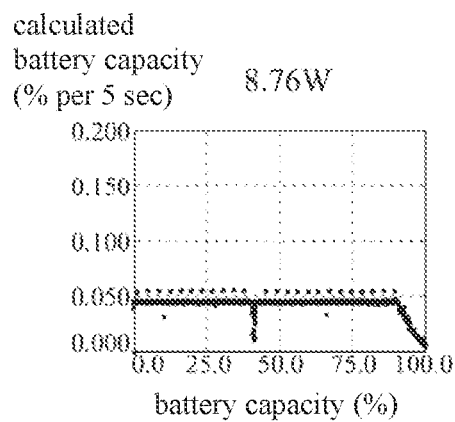
FIG. 9A is a schematic diagram showing a calculated battery capacity-time-ratio at a charging power of 8.76W according to an embodiment.
Figure 9B:
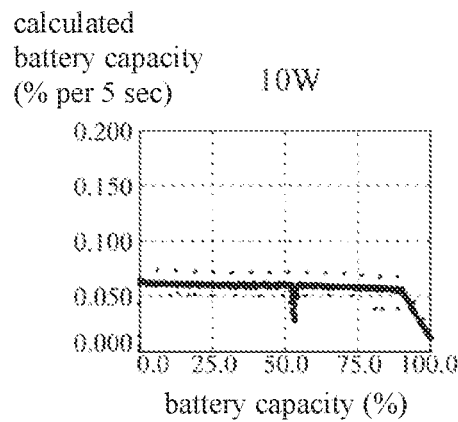
FIG. 9B is a schematic diagram showing a calculated battery capacity-time-ratio at a charging power of 10W according to an embodiment.
Figure 9C:
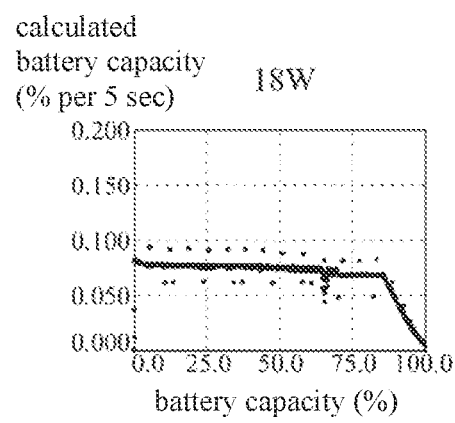
FIG. 9C is a schematic diagram showing a calculated battery capacity-time-ratio at a charging power of 18W according to an embodiment.
Figure 9D:
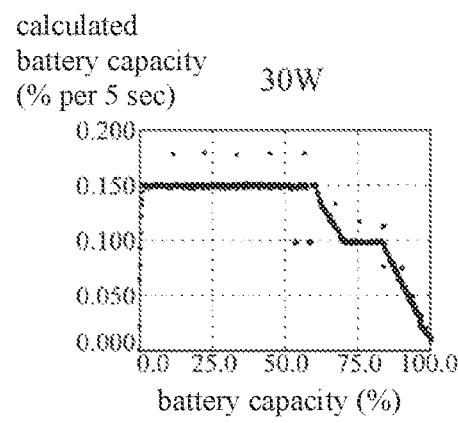
FIG. 9D is a schematic diagram showing a calculated battery capacity-time-ratio at a charging power of 30W according to an embodiment.
Figure 10A:
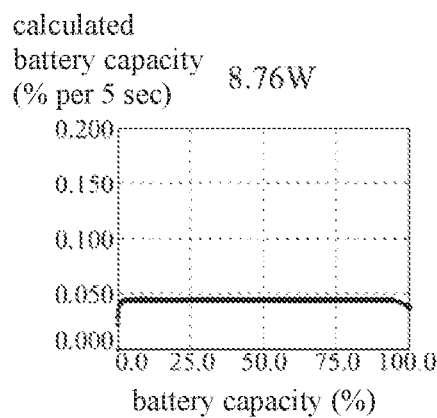
FIG. 10A is a schematic diagram showing a smoothed calculated battery capacity-time-ratio at a charging power of 8.76W according to an embodiment.
Figure 10B:
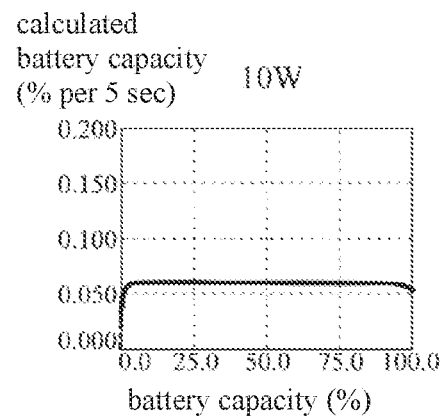
FIG. 10B is a schematic diagram showing a smoothed calculated battery capacity-time-ratio at a charging power of 10W according to an embodiment.
Figure 10C:
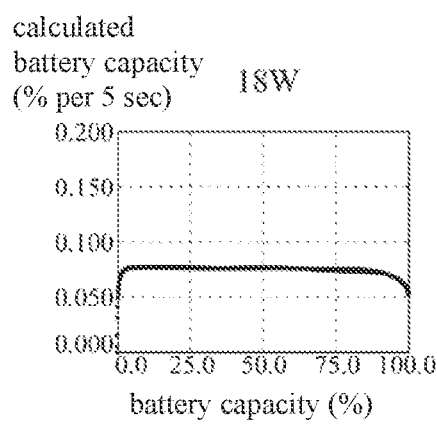
FIG. 10C is a schematic diagram showing a smoothed calculated battery capacity-time-ratio at a charging power of 18W according to an embodiment.
Figure 10D:
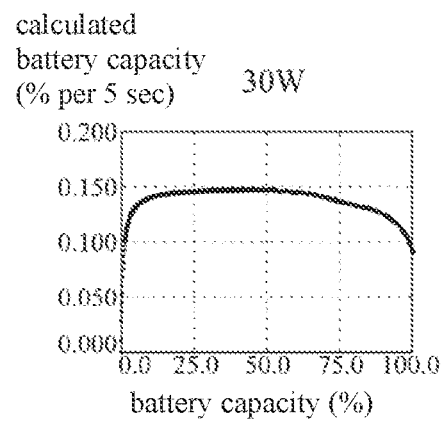
FIG. 10D is a schematic diagram showing a smoothed calculated battery capacity-time-ratio at a charging power of 30W according to an embodiment.
Figure 11:
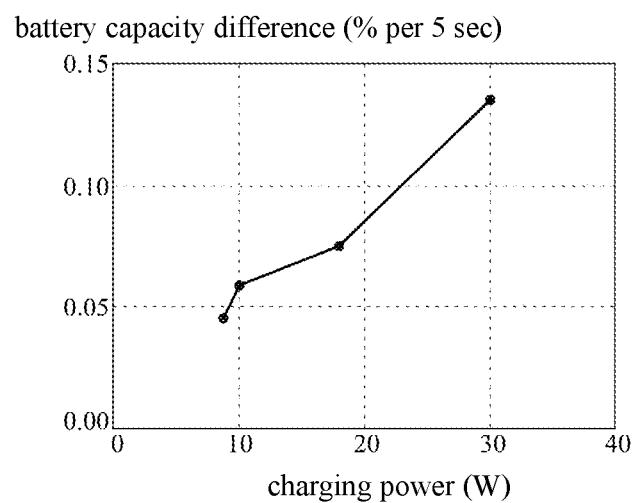
FIG. 11 is a schematic diagram showing a relationship between the calculated battery capacity-time-ratio and the charging power according to an embodiment.

In an embodiment, in order to establish the relationship between the calculated battery capacity-time-ratio and the charging power, the charging curve at different charging powers is offered as reference. As shown in FIG. 8, at the charging power of 8.76W, 10W, 18W, 30W respectively, the battery with a defined capacity is charged and the change of battery capacity with time is recorded. When the battery capacity that changes with time under the various charging powers is known, the calculated battery capacity-time-ratio under the various charging powers is estimated. The calculated battery capacity-time-ratio is determined when the charging curve of the battery capacity changing with time is obtained. As shown in FIG. 9A to FIG. 9D, at the charging power of 8.76W, 10W, 18W, and 30W, the battery capacity changing per unit time is approximately a fixed value, and in order to accurately represent the calculated battery capacity-time-ratio at a specified charging power, the smoothing techniques (such as cumulative average) is used to estimate the calculated battery capacity-time-ratio shown in FIG. 9A to FIG. 9D to obtain the smoothing calculated battery capacity-time-ratio shown in FIG. 10A to FIG. 10D. Performing parameter estimation based on the smoothing calculated battery capacity-time-ratio shown in FIG. 10A to FIG. 10D, the relational schema between the calculated battery capacity-time-ratio (percentage per 5 seconds) and the charging power is obtained, as shown in FIG. 11, for any given calculated battery capacity-time-ratio, the required charging power is estimated according to the power conversion equation established by the relationship between the known calculated battery capacity-time-ratio and the charging power. In an embodiment, the power conversion equation uses a linear regression model to represent the relationship between the calculated battery capacity-time-ratio and the charging power, which is not limited herein. For example, the relationship between the calculated battery capacity-time-ratio and the charging power shown in FIG. 11 can be expressed as D=0.003991*P+0.011886, where D represents the calculated battery capacity-time-ratio, and P represents the charging power. Therefore, according to any given calculated battery capacity-time-ratio of the battery module, the required charging power is estimated according to the power conversion equation. Wherein, the power conversion equation uses a linear regression model to represent the functional relationship between the calculated battery capacity-time-ratio and the charging power. In addition, any functional relationship representing the relationship between the calculated battery capacity-time-ratio and the charging power is used as the power conversion equation in other embodiments.

Figure 6:
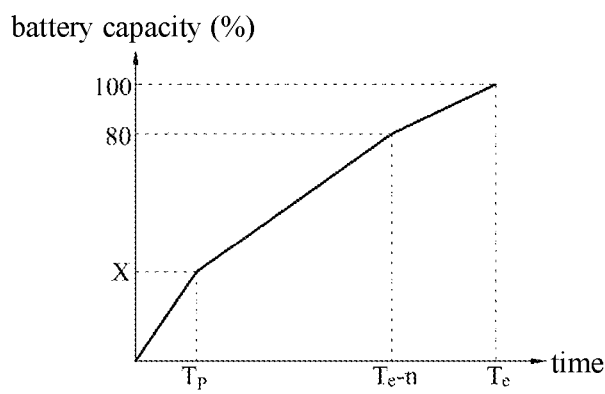
FIG. 6 is a schematic diagram showing a charging curve of battery capacity and time when the preset target battery capacity is 80% of the battery capacity according to an embodiment.

In one embodiment, as shown in FIG. 6, set the preset target battery capacity Y as 80% of battery capacity and the charging time interval as PM 10:00 to AM 7:00, the current time $T_p$ of power on is AM 0:00, the initial battery capacity X is 20% of the battery capacity, and set the charging completion time in the charging process as two hours before the charging end time when the battery capacity reaches 80%. Therefore, the charging time interval is 5 hours ($T_c$-n-$T_p$=7-2-0=5 hours), the charging battery capacity is 60% (80-X=80-20=60%), the calculated battery capacity-time-ratio=60%/5 hours=12%/hour=12%/3600 sec=0.016666%/5 sec, that is, the calculated battery capacity-time-ratio D is 0.016666. After calculating the calculated battery capacity-time-ratio, the calculated battery capacity-time-ratio D=0.016666 is substituted into the power conversion equation D=0.003991*P+0.011886, that is, P=(D-0.011886)/0.003991=(0.016666-0.011886)/0.003991=1.197 (W), which is the charging power.

Further, after calculating the required calculated battery capacity-time-ratio and converting it into the charging power required by the electronic device, according to the circuit characteristics of the battery module, the charging power is converted into the charging current or the charging voltage required by the battery module, so as to avoid the problem that the battery is in high battery capacity for long time, and further maximize the battery life.

In summary, the charging power is dynamically adjusted in a charging time interval in the embodiments, so that the battery is charged to a fully battery capacity state at the charging end time of the charging time interval, and the problem that the battery life is impaired when the battery is in a fully battery capacity state or a high battery capacity state for a long time is avoided. Therefore, the dynamic charging power is used to optimize the battery life, so as to effectively extend the battery life and provide users with better charging options.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
   a battery module;
   a power supply, configured to provide a supplied power;
   a power controller, electrically connected between the battery module and the power supply, to obtain an initial battery capacity of the battery module and a current time when the power supply is connected to an external power supply, and to control the power supply to charge the battery module; and
   a processor, electrically connected to the power controller, the processor is configured to:
      set a preset target battery capacity and a charging completion time;
      obtain a charging battery capacity according to the preset target battery capacity and the initial battery capacity, and obtain a charging time interval according to the charging completion time and the current time;
      calculate a calculated battery capacity-time-ratio according to the charging battery capacity and the charging time interval;
      convert the calculated battery capacity-time-ratio into a charging power according to a power conversion equation, and transmit the charging power to the power controller, and then the power controller converts the supplied power provided by the power supply to a charging voltage or a charging current according to the charging power; and
      charge the battery module to the preset target at a charging end time of the charging time interval;
      wherein the power conversion equation uses a linear regression model to represent a relationship between the calculated battery capacity-time-ratio and the charging power, and the calculated battery capacity-time-ratio changes as the charging power changes; and
      wherein in order to accurately represent the calculated battery capacity-time-ratio at a specified charging power, smoothing techniques are used to estimate the calculated battery capacity-time-ratio to obtain a smoothing calculated battery capacity-time-ratio, and parameter estimation is performed based on the smoothing calculated battery capacity-time-ratio to obtain the relationship between the calculated battery capacity-time-ratio and the charging power.

2. The electronic device according to claim 1, wherein the power controller further comprising:
   a power supply controller, electrically connected to the battery module, the power supply, and the processor, and the power supply controller is configured to control the power supply to charge the battery module according to the charging power; and
   a power managing controller, electrically connected to the battery module and the processor, to obtain the initial battery capacity and the current time.

3. The electronic device according to claim 1, wherein charging completion time is a user preset completion time or a customary completion time obtained by the processor according to a usage state history.

4. The electronic device according to claim 1, wherein the calculated battery capacity-time-ratio is obtained by dividing the charging battery capacity by the charging time interval.

5. The electronic device according to claim 1, wherein the calculated battery capacity-time-ratio further includes a system power consumption battery capacity difference.

6. The electronic device according to claim 1, wherein the preset target battery capacity is a full battery capacity of the battery module.

7. The electronic device according to claim 6, wherein the charging completion time is a user preset end time or a customary end time obtained by the processor according to a usage state history.

8. A charging method, applied to an electronic device with a battery module, the charging method comprising:
   setting a preset target battery capacity and a charging completion time;
   obtaining an initial battery capacity of the battery module and a current time when the electronic device is connected to an external power supply;
   obtaining a charging battery capacity according to the preset target battery capacity and the initial battery capacity, and obtaining a charging time interval according to the charging completion time and the current time;
   calculating a calculated battery capacity-time-ratio according to the charging battery capacity and the charging time interval;
   converting the calculated battery capacity-time-ratio into a charging power according to a power conversion equation; and
   charging the battery module to the preset target battery capacity at the end of the charging time interval according to the charging power;
   wherein the calculated battery capacity-time-ratio is obtained by dividing the charging battery capacity by
   wherein the power conversion equation uses a linear regression model to represent a relationship between the calculated battery capacity-time-ratio and the charging power, and the calculated battery capacity-time-ratio changes as the charging power changes; and
   wherein in order to accurately represent the calculated battery capacity-time-ratio at a specified charging power, smoothing techniques are used to estimate the calculated battery capacity-time-ratio to obtain a smoothing calculated battery capacity-time-ratio, and parameter estimation is performed based on the smoothing calculated battery capacity-time-ratio to obtain the relationship between the calculated battery capacity-time-ratio and the charging power.

9. The charging method according to claim 8, wherein charging completion time is a user preset completion time or a customary completion time obtained from a usage state history.

10. The charging method according to claim 8, wherein before the step of converting the calculated battery capacity-time-ratio convert into the charging power, the charging method further includes:
    estimating a system power consumption battery capacity difference of the electronic device; and
    combining the system power consumption battery capacity difference into the calculated battery capacity-time-ratio.

11. The charging method according to claim 8, wherein the power conversion equation represents the relationship between the calculated battery capacity-time-ratio and the charging power by a linear regression model, and the calculated battery capacity-time-ratio changes as the charging power changes.

12. The charging method according to claim 8, wherein the step of charging the battery module according to the charging power further comprises: converting a supplied power into a charging current or a charging voltage to charge the battery module according to the charging power.

13. The charging method according to claim 8, wherein the preset target battery capacity is full battery capacity of the battery module.

14. The charging method according to claim 13, wherein the charging completion time is a user preset end time or a customary end time obtained from a usage state history.

* * * * *